United States Patent
Huang

(10) Patent No.: US 8,277,885 B2
(45) Date of Patent: Oct. 2, 2012

(54) ELECTRICALLY CONDUCTIVE FOAM AND APPLICATION METHOD FOR SAME

(75) Inventor: Chao-Jui Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 545 days.

(21) Appl. No.: 12/541,134

(22) Filed: Aug. 13, 2009

(65) Prior Publication Data

US 2010/0291288 A1  Nov. 18, 2010

(30) Foreign Application Priority Data

May 13, 2009 (CN) .......................... 2009 1 0302259

(51) Int. Cl.
*B05D 5/12* (2006.01)

(52) U.S. Cl. ............................ 427/244; 427/58; 428/550

(58) Field of Classification Search ................. 427/427, 427/427.5, 427.6, 427.7, 243, 424, 245, 246, 427/247; 29/DIG. 39; 216/98
See application file for complete search history.

(56) References Cited

U.S. PATENT DOCUMENTS

| | | | |
|---|---|---|---|
| 5,151,222 A * | 9/1992 | Ruffoni | 252/511 |
| 6,395,402 B1 * | 5/2002 | Lambert et al. | 428/550 |
| 2007/0183919 A1 * | 8/2007 | Ayer et al. | 419/2 |
| 2009/0071983 A1 * | 3/2009 | Pritchard | 222/211 |

* cited by examiner

*Primary Examiner* — Michael Cleveland
*Assistant Examiner* — Tabassom Tadayyon Eslami
(74) *Attorney, Agent, or Firm* — Altis Law Group, Inc.

(57) ABSTRACT

A kind of electrically conductive foam for preventing an electronic component from electro-magnetic interference includes the following compositions: electrically conductive material accounting for about 5% to about 10% by weight; plastic material accounting for about 10% to about 16% by weight; propellant accounting for about 65% to about 75% by weight; surfactant accounting for about 0.5% to about 4% by weight; and auxiliary material accounting for about 4% to about 5% by weight.

8 Claims, 2 Drawing Sheets

ELECTRICALLY CONDUCTIVE FOAM AND APPLICATION METHOD FOR SAME

BACKGROUND

1. Technical Field

The present disclosure relates to foam, and particularly to electrically conductive foam and a method of applying the electrically conductive foam.

2. Description of Related Art

Generally, an electrically conductive gasket may be shielded from electro-magnetic interference (EMI) by covering the conductive gasket with foam and a layer of electrically conductive cloth. The conductive cloth may be made of highly conductive and anti-corrosive fabric, where an electrically conductive adhesive tape is usually provided on the conductive cloth. In use, the electrically conductive gasket should be manually cut into a required shape, and affixed to a surface of an electronic component using the conductive adhesive tape.

However, it is time-consuming to cut the electrically conductive gasket especially when there are many electrically conductive gaskets needed to be cut. The electrically conductive gasket also may not be properly contacted with a surface of the electronic component because of carelessness of an operator, which results in the reduction or lose of EMI shielding performance of the electrically conductive gasket.

DETAILED DESCRIPTION

An exemplary embodiment of electrically conductive foam includes electrically conductive material, plastic material, propellant, surfactant, and auxiliary material.

The electrically conductive material includes graphite grains or metal grains having good electrically conductive performance. In one embodiment, the electrically conductive material accounts for about 5% to about 10% of the electrically conductive foam by weight.

The plastic material includes polyisobutyl methacrylate or acrylic resin. In one embodiment, the plastic material accounts for about 10% to about 16% of the electrically conductive foam by weight.

The propellant is a liquid such as ethylene-vinyl acetate copolymer, polyethylene, or butane having high-pressure, and has high solubility and volatility performance. The propellant is capable of dissolving and frothing the electrically conductive material and plastic material to make the electrically conductive material become into foam. In one embodiment, the propellant accounts for about 65% to about 75% of the conductive foam by weight.

In one embodiment, the surfactant is sorbitan trioleate, and is used to control viscosity of the electrically conductive material dissolved by the propellant, and also to enhance the frothing of the propellant. In one embodiment, the surfactant accounts for about 0.5% to about 4% of the electrically conductive foam by weight.

The auxiliary material may include at least one of plasticizer, silicon rubber, pigment, and flame retardant. The plasticizer can be used to reduce the viscosity of the electrically conductive material frothed by the propellant. The silicon rubber makes the electrically conductive foam easily removable from an electronic component. The pigment can be used to modify color of the electrically conductive foam. The flame retardant can be used to make the electrically conductive foam flame retardant. In one embodiment, the auxiliary material accounts for about 4% to about 5% of the electrically conductive foam by weight.

The weight proportions of the electrically conductive material, the plastic material, and the propellant can be modified as needed to suit specific needs. For example, when the electrically conductive foam needs to have a higher electrically conductive performance, more electrically conductive material can be added to the electrically conductive foam.

Figure 1:
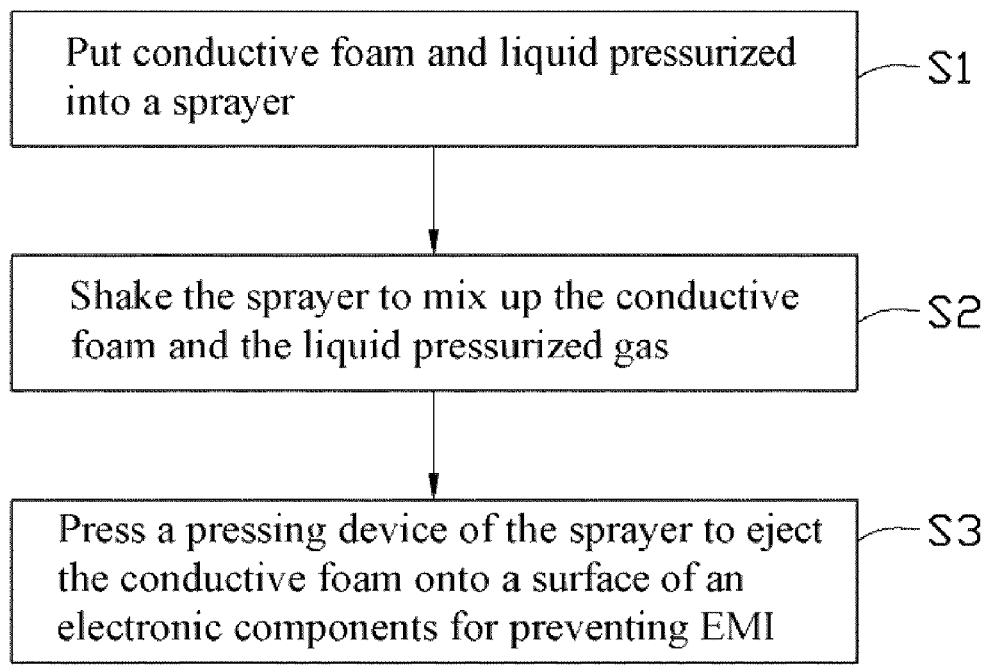
FIG. 1 is a flowchart of an exemplary embodiment of a method of applying electrically conductive foam.
Figure 2:
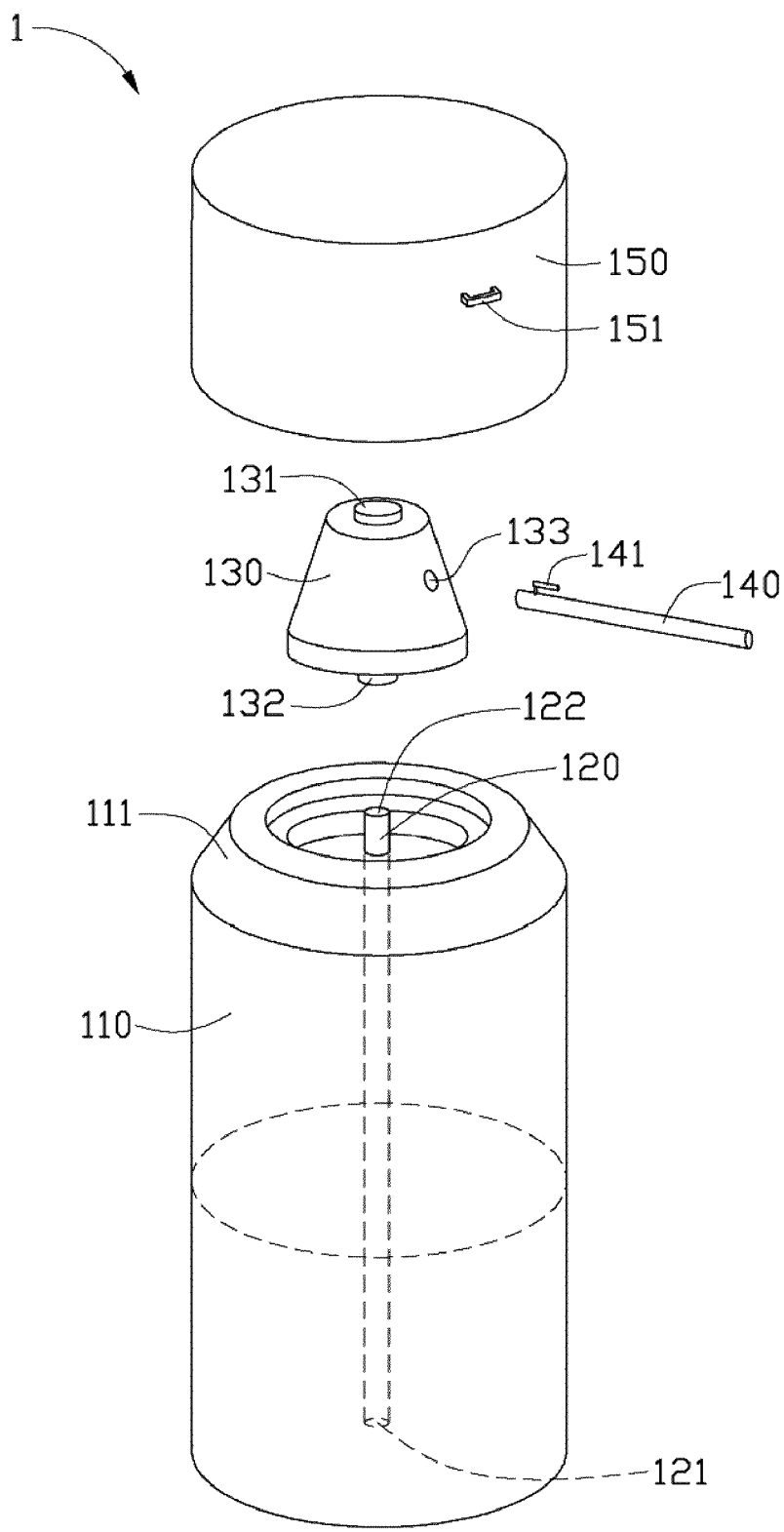
FIG. 2 is an exploded, isometric view of an exemplary embodiment of a sprayer for spraying the electrically conductive foam.

Referring to FIG. 1 and FIG. 2, a method of applying the conductive foam is provided, which includes the following steps.

In step S1, the electrically conductive foam and liquid pressurized gas such as nitrogen or dimethyl are put into a sprayer 1. The liquid pressurized gas makes pressure inside the sprayer 1 to be much higher than outside the sprayer 1. The sprayer 1 includes a jar body 110, a sucker 120, a jar lid 150, a nozzle 130, and a spray pipe 140. The spray pipe 140 may be formed with different shapes to make the conductive foam eject with a required shape. Therefore, a plurality of spray pipes 140 with different shapes may be provided for a variety of needs. The jar body 110 includes an airproof cover 111. The nozzle 130 includes a pressing device 131, an opening 132, and a spout 133. A first end 121 of the sucker 120 extends into the inside of the jar body 110. A second end 122 opposite to the first end 121 of the sucker 120 passes through the airproof cover 111 of the jar body 110 and extends to the outside of the jar body 110.

In step S2, the sprayer 1 is shaken to mix the components of the electrically conductive foam and the liquid pressurized gas.

In step S3, the pressing device 131 is pressed to communicate the opening 132 with the spout 133 via well known technology. According to Bernoulli's principle, because the pressure inside the sprayer 1 is much higher than the external pressure, the conductive foam rises along the sucker 120 and is ejected, and may be directed to a surface of the electronic component, to provide electro-magnetic interference (EMI) shielding, via the spout 133 and the spray pipe 140. Once ejected, the electrically conductive foam solidifies as the liquid pressurized gas volatilizes, and the plastic material expands quickly.

One side of the jar lid 150 defines a handle 151. One end of the spray pipe 140 forms a pothook 141 corresponding to the handle 151. The spray pipe 140 can be hung on the side of the jar lid 150 via the pothook 141 engaging the handle 151 for storage purposes.

The conductive foam mentioned above does not need to be cut into a required shape, and can be properly contacted with the surface of the electronic component in a consistent manner to prevent EMI.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A method of applying electrically conductive foam, comprising:

putting the electrically conductive foam and liquid pressurized gas into a sprayer;

shaking the sprayer to mix the electrically conductive foam and the liquid pressurized gas; and ejecting the electrically conductive foam out from the sprayer onto a surface of an electronic component.

2. The method of claim 1, wherein the sprayer comprises a jar body, an airproof cover covered on the jar body, a sucker, a nozzle, and a spray pipe; the nozzle comprises a pressing device; a first end of the sucker extents into the inside of the jar body; a second end opposite to the first end of the sucker passes through the airproof cover of the jar body and extents to the outside of the jar body; when the pressing device is pressed, the conductive foam rises along the sucker and is ejected to the electronic component via the nozzle and the spray pipe.

3. A method for preventing an electronic component from electro-magnetic interference (EMI), comprising:

providing electrically conductive material accounting for about 5% to about 10% by weight;

providing plastic material accounting for about 10% to about 16% by weight;

providing propellant accounting for about 65% to about 75% by weight, to dissolve and froth the electrically conductive material and the plastic material to become foam;

providing surfactant accounting for about 0.5% to about 4% by weight, to control the viscosity of the electrically conductive material dissolved by the propellant;

providing auxiliary material accounting for about 4% to about 5% by weight;

providing liquid pressurized gas;

putting the electrically conductive material, the plastic material, the propellant, the surfactant, the auxiliary material, and the liquid pressurized gas into a sprayer;

haking the sprayer to mix up the electrically conductive material, the plastic material, the propellant, the surfactant, the auxiliary material, and the liquid pressurized gas; and ejecting the mixture onto the electronic component.

4. The method of claim 3, wherein the electrically conductive material comprises graphite grains or metal grains with good electrically conductive performance.

5. The method of claim 3, wherein the plastic material comprises polyisobutyl methacrylate, or acrylic resin.

6. The method of claim 3, wherein the propellant comprises ethylene-vinyl acetate copolymer, polyethylene, or butane.

7. The method of claim 3, wherein the surfactant comprises sorbitan trioleate.

8. The method of claim 3, wherein the auxiliary material comprises plasticizer, silicon rubber, pigment, or flame retardant.

* * * * *